(12) United States Patent
Pisula

(10) Patent No.: US 6,830,363 B2
(45) Date of Patent: Dec. 14, 2004

(54) GLOW TUBE ILLUMINATION DEVICE AND ILLUMINATION SYSTEM FOR BICYCLES

(76) Inventor: Richard L. Pisula, 149 Rosedale Ct., Bloomingdale, IL (US) 60108

( * ) Notice: Subject to any disclaimer, the term of this patent is extended or adjusted under 35 U.S.C. 154(b) by 0 days.

(21) Appl. No.: 10/298,769

(22) Filed: Nov. 18, 2002

(65) Prior Publication Data

US 2004/0095776 A1 May 20, 2004

(51) Int. Cl.[7] ............................. B21J 6/00; F21V 33/00
(52) U.S. Cl. ........................ 362/474; 362/800; 362/511; 362/806
(58) Field of Search ................................. 362/474, 473, 362/800, 806, 545, 555, 511, 557

(56) References Cited

U.S. PATENT DOCUMENTS

| | | | | |
|---|---|---|---|---|
| 3,963,914 A | * | 6/1976 | Browning et al. | 362/118 |
| 4,630,177 A | * | 12/1986 | Von Kohorn et al. | 362/551 |
| 4,819,135 A | * | 4/1989 | Padilla et al. | 362/473 |
| 4,966,419 A | * | 10/1990 | Cunard | 301/2.5 |
| 5,826,972 A | * | 10/1998 | Chiu | 362/188 |
| 6,337,946 B1 | * | 1/2002 | McGaffigan | 385/146 |
| 2003/0133311 A1 | * | 7/2003 | Robertson et al. | 362/555 |

* cited by examiner

Primary Examiner—Alan Cariaso
Assistant Examiner—Mark Tsidulko
(74) Attorney, Agent, or Firm—Brian R. Rayve

(57) ABSTRACT

A glow illumination device and system which utilizes a plurality of the devices to make bicycles more visible in low light conditions. The glow illumination devices include a translucent glow tube which fits in a coaxial, radially spaced position around respective support tubes of the bicycle frame, front forks, and handlebars. An elongate, doughnut-shaped annular glow chamber is formed between the glow tube and the associated support tube to permit light propagation therethrough. A pair of end caps each have an inner flange defining a central hole of a size sufficient to receive the associated support tube and an outer flange at an outer periphery to retain the glow tube engaged between the end caps. A plurality of light emitting diodes are retained to each end cap, and are operatively connected to a common battery pack affixed to the bicycle frame through sheathed wires to illuminate the entire length of the glow tube.

28 Claims, 9 Drawing Sheets

GLOW TUBE ILLUMINATION DEVICE AND ILLUMINATION SYSTEM FOR BICYCLES

BACKGROUND OF THE INVENTION

1. Field

Figure 1:
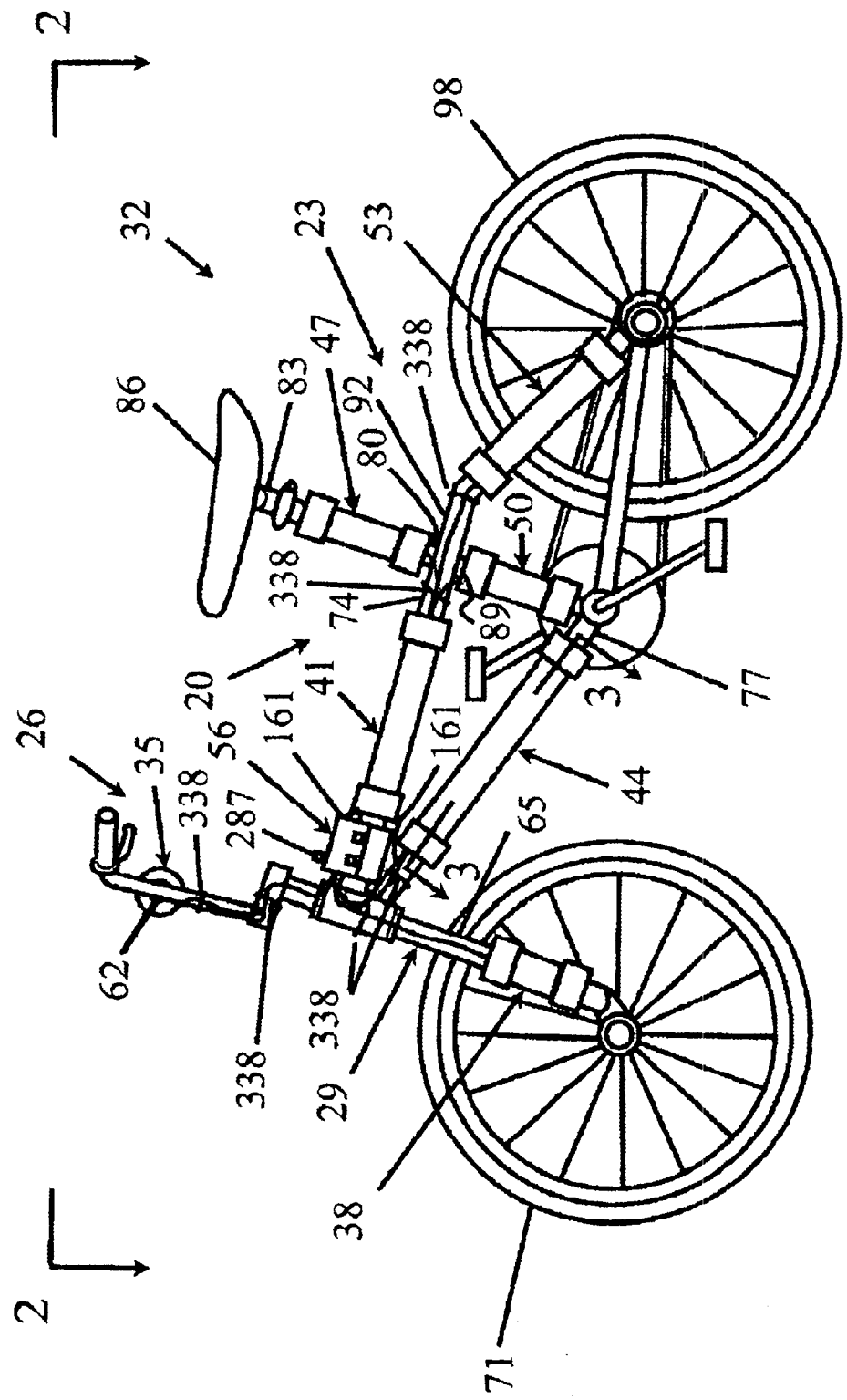

The present invention relates generally to illumination devices which mount to bicycles to provide greater visibility to motor vehicle drivers and others in low light conditions, and more specifically to illumination devices that illuminate the outline of the bicycle so vehicle drivers may identify the bicycle, distance, and direction of travel.

2. State of the Art

Bicycles are widely used a healthy and fuel-efficient way to get around in cities and in rural settings. Some riders ride on sidewalks and others ride on streets which are shared with motor vehicles such as cars and trucks. One major drawback to bicycles is that they are difficult for motor vehicle drivers to see in low light conditions such as dusk-to-dawn and in stormy weather. Therefore, there are many accidents between motor vehicles and bicycles during such times.

Bicycles are commonly equipped with various light reflectors and lighting devices for use in low light conditions. Reflectors work by incorporating a plurality of small angled reflecting surfaces that reflect incoming light primarily back toward the light source, such as motor vehicle head lights. Red colored reflectors are commonly mounted to the rear of the bicycle facing in a rearward direction to signify to vehicle drivers that they are approaching the rear of the bicycle. Red or white colored reflectors are also commonly mounted to the spokes of the front and rear wheels, and to the front and rear of the pedals. These reflectors move in circular motions to help identify the bicycle and its direction of travel to vehicle drivers. Reflective tape is also used on bicycles, being wrapped variously around the bicycle frame, handle bars, front fork, and wheel rims.

There are various drawbacks to these reflectors. Firstly, the head lights of the motor vehicle must strike the reflector generally straight-on for the vehicle driver to see the reflected light from the reflector mounted to the bicycle. Secondly, vehicle drivers have difficulty determining that a bicycle is producing the light, and the distance, direction, and speed of the bicycle. Finally, it is difficult to make these reflectors much larger to improve low light visibility without severely restricting the normal operation of the bicycle.

Lighting devices are more effective than reflectors since they generate their own light rather than requiring light from an outside source to be shined thereon. Such lighting device typically comprise a streamlined, flashlight type unit which mounts to the handlebars pointing a focused beam of light forwardly of the bicycle to illuminate ahead of the bicycle and make the bicycle more visible to vehicle drivers approaching the bicycle from the front. A rear light of similar design but with much smaller mounts to the bicycle main frame pointing rearwardly of the bicycle, emitting a non-focused, red light to warn vehicles approaching the bicycle from the rear. The lighting devices utilize small light bulbs which are powered either by internally contained batteries, or by a small electrical generator mounted to the bicycle and having a small drive wheel rotationally driven by engaging a tire on the front or rear wheel of the bicycle.

There are various drawbacks to these lighting devices. Firstly, the batteries typically do not last long due to the power requirements of the light bulbs and must be frequently replaced. While a generator does not require replacement like batteries, it does not provide electrical power, and thus light, when the bicycle is stationary or moving only slowly. Secondly, vehicle drivers have difficulty determining that a bicycle is producing the light, and the distance, direction, and speed of the bicycle. Thirdly, the lighting devices do not provide illumination of the bicycle to motorists approaching from the side of the bicycle. Fourthly, it is difficult to make these lighting devices much larger to improve low light visibility without severely restricting the normal operation of the bicycle. Finally, lighting devices for bicycles are only useful if desired by and used by the riders. These lighting devices typically do not appeal to younger riders, who may not want the lighting devices mounted to their bicycles, or whom may not use by turning them on even when mounted to the bicycle if not perceived as interesting to children or fashionable. Younger riders yet are more in need of being visible to vehicle drivers due to their smaller size, and their less experience and skilled in bicycle riding and safety.

Various lighting devices have been developed and patented in an attempt to improve over the above described lighting devices. For example, in U.S. Pat. No. 4,088,882 issued to Lewis on May 9, 1978 is disclosed a fluorescent bike lamp for bicycles. The lamp includes a standard fluorescent bulb which is disposed within a plastic tube and maintained in spaced relationship with the interior walls of said tube by resilient spacers. A pair of end caps are adhesively bonded to respective ends of the tube. The lamp is attached to the bicycle frame and the fluorescent bulb is fired by an alternating current provided by an alternator or a combination of a battery and an inverter. A step-up transformer is connected between the alternator and the flourescent bulb to achieve the required firing voltage. There are several drawbacks to this lighting device. Firstly, the generator does not provide electrical power, and thus light, when the bicycle is stationary or moving only slowly. Secondly, the neon lights are relatively expensive to replace.

In U.S. Pat. No. 5,008,782 issued to Murray on Apr. 16, 1991 is disclosed a lighted handlebars for bicycles. The handlebars comprises a transparent or partially transparent epoxy and includes a plurality of electric lamps embedded in the epoxy along the length thereof. Electricity to power the lamps is supplied by a battery pack or bicycle generator through jacks which are inserted into the handlebars adjacent where the handlebars attaches to the stem of the bicycle. The lamps may be of different colors, and may individually flash. The effect is stated to be attractive and appealing to youngsters to encourage the use of the lighting portion of the handlebars. However, there are several drawbacks to this lighting device. Firstly, if batteries are used to supply electrical power, they typically do not last long due to the power requirements of the lamps and must be frequently replaced. If a generator is used to supply electrical power, it does not provide electrical power, and thus light, when the bicycle is stationary or moving only slowly. Secondly, vehicle drivers have difficulty determining that a bicycle is producing the light, and the distance, direction, and speed of the bicycle. Finally, the lighting devices do not provide illumination of the bicycle to motorists approaching from the side of the bicycle.

In U.S. Pat. No. 6,158,881 issued to Came on Dec. 12, 2000 is disclosed a lighted seat post for bicycles. The seat post includes a hollow support tube which is partly inserted into a seat support tube of the bicycle frame. The seat post includes a bracket for mounting and supporting a bicycle seat. A series of light emitting diodes are mounted to a printed circuit board disposed within the seat post to emit light through corresponding windows in the support tube. Electricity is supplied by batteries inserted in the support tube and retained by a removable bottom end cap. The support tube may also contain rechargeable cells which can be recharged through a power connector at the bottom end of the support tube. However, there are several drawbacks to this lighting device. Firstly, vehicle drivers have difficulty determining that a bicycle is producing the light, and the distance, direction, and speed of the bicycle. Secondly, the lighting device is for a seat post, and it is difficult to make the lighting device much larger or for use in additional locations on the bike to improve low light visibility.

In U.S. Pat. No. 4,901,209 issued to Nitz on Feb. 13, 1990 is disclosed an illuminated bicycle having a main frame, a handlebars, and two wheels made from hollow tubular members which allow light to be transmitted through their respective side walls. A light bulb is mounted within one of the hollow tubular members with respective ends of a bundle of flexible optical fibers positioned adjacent thereto so light therefrom is transmitted through the optical fibers. The optical fibers extend through the tubes of the main frame so that when the lamp is illuminated, the hollow tubular members glow to make them visible at night. The lamp may be powered by batteries or a wheel-driven bicycle generator. However, there are several drawbacks to this lighting device. Firstly, the entire light output for the main frame is provided by a single lamp, which is likely insufficient to light the entire main frame. Secondly, the illumination device is built into the bicycle and is not retrofittable onto other bicycles. Thirdly, the high cost of such an illuminated bicycle would likely deter many people from purchasing the bicycle.

In U.S. Pat. No. 4,860,177 issued to Simms on Aug. 22, 1989 is disclosed a bicycle safety light. The safety light includes a housing which mounts to a rear portion of a bicycle using a clamp. A battery powered light-producing assembly is disposed within the housing and includes a plurality of light emitting diodes disposed in mating holes aligned in rows through a front display plate of the housing. A repeating converging pattern of the light rows is provided by alternate illumination of the rows of light emitting diodes which starts at the outer edges of the display plate converging to a center portion thereof. The safety light visually directs and emphasizes to a following motorist the center position of the rider and the bicycle. However, there are several drawbacks to this lighting device. Firstly, vehicle drivers still may have difficulty determining that a bicycle is producing the light, and the distance, direction, and speed of the bicycle. Secondly, the lighting device does not provide illumination of the bicycle to motorists approaching from the side of the bicycle. Finally, it is difficult to make the lighting device much larger to improve low light visibility without severely restricting the normal operation of the bicycle.

In U.S. Pat. No. 4,819,135 issued to Padilla, et al. on Apr. 4, 1989 is disclosed a bicycle lighting device. The lighting device includes three tubes made of transparent flexible plastic, each tube being provided with two rows of longitudinally spaced light emitting diodes embedded at diametrically opposed locations along each tube. Each tube has a longitudinal slit for insertion around a support tube of the main frame of a bicycle. The three tubes and a battery pack are interconnected by electrical wires, the battery pack which powers the light emitting diodes and which includes a sequencing circuit for flashing the light emitting diodes in sequence. The three tubes are secured in a triangular configuration on the support tubes of the main frame of the bicycle to form a standard triangular slow moving vehicle signal when viewed from either side of the bicycle which flashes to signal motorists. However, there are several drawbacks to this lighting device. Firstly, the tubes are not firmly affixed to the support tubes of the main frame of the bicycle. Secondly, while the tubes outline the main frame of the bicycle, only dots of light are produced by the light emitting diodes such that motorists may have difficulty identifying the bicycle as a bicycle.

However, there exists a need for an illumination device and system for bicycles which 1) utilizes light emitting devices which are powered by one or more batteries rather than an electrical generator so as to produce continuous illumination even when the bicycle is moving slowly or not moving at all; 2) the light emitting devices have low electrical power requirements so the batteries last a reasonable period of time before needing to be replaced; 3) which illuminates the whole bicycle sufficiently that motorists recognize the bicycle as a bicycle, and know the distance, direction, and speed of the bicycle; 4) which illuminates the bicycle to motorists approaching from the side of the bicycle; 5) which is large enough to improve low light visibility yet integrated into the bicycle at various locations so as not to restrict the normal operation of the bicycle; 6) which appeals to younger riders as being fashionable so they want the lighting device installed and turn it on during periods of low light; 7) which utilizes light emitting devices having a long life so as not to require replacement; 8) in which the light output of the light emitting devices sufficiently lights the bicycle so as to be easily seen by motorists; 9) in which the illumination devices may be built into new bicycles at time of manufacture and is also easily retrofittable to existing bicycles; 10) which is of a low cost so as to be reasonably priced to consumers; 11) the illumination devices are firmly affixed to the bicycle; and 12) which illuminates the entire outline the bicycle rather than only dots of light so motorists have no difficulty identifying the bicycle as a bicycle.

SUMMARY OF THE INVENTION

The present invention is a glow illumination device and system for making a bicycle more visible in low light conditions. The bicycle is a standard type which includes a plurality of support tubes forming a main frame rotationally supporting a rear wheel. A handle bars is connected to a front fork rotationally supporting a front wheel. The handle bars and front fork are pivotally connected to the main frame. The glow illumination device and system are connectable to a power. supply device, preferably one or more batteries, which supplies electrical energy to power the glow illumination device and system.

The glow illumination device includes a glow tube which permits light to pass therethrough. The glow tube has an inner diameter which is larger than an outer diameter of an associated support tube of the bicycle. The glow tube is adapted to be disposed in a coaxial, radially spaced position about the associated support tube such that an elongate doughnut-shaped annular glow chamber is formed therebetween to permit light propagation therethrough. A pair of end caps each have an end wall with a central hole of a size sufficient to receive the associated support tube. An outer periphery of each end cap is adapted to retain the glow tube coaxially disposed about the support tube engaged between the end caps. At least one light emitting device is retained to the end wall of one end cap and operatively connected to the power supply device.

The glow illumination device preferably has a translucent glow tube which permits light to pass therethrough but which diffuses the light such that the glow tube glows substantially evenly along an entire longitudinal length thereof. The light emitting devices comprise light emitting diodes which are retained to the end wall of each end cap, and operatively connected to the power supply device. The diodes of each end cap comprise a diode group, the diode groups being electrically interconnected by a pair of longitudinal wires extending through the outer glow tube.

The glow illumination system includes a plurality of the glow illumination devices having the translucent glow tubes, and at least one light emitting device retained to the end wall of one end cap. The glow illumination devices are operatively connected to the power supply device. The glow illumination devices are each adapted to fit disposed about an associated support tube of the bicycle. A separate battery pack is adapted to mount to the bicycle and to contain the power supply device in the form of at least one battery. The battery pack is electrically connected to the light emitting devices by respective electrical cables.

THE DRAWINGS

Figure 2:
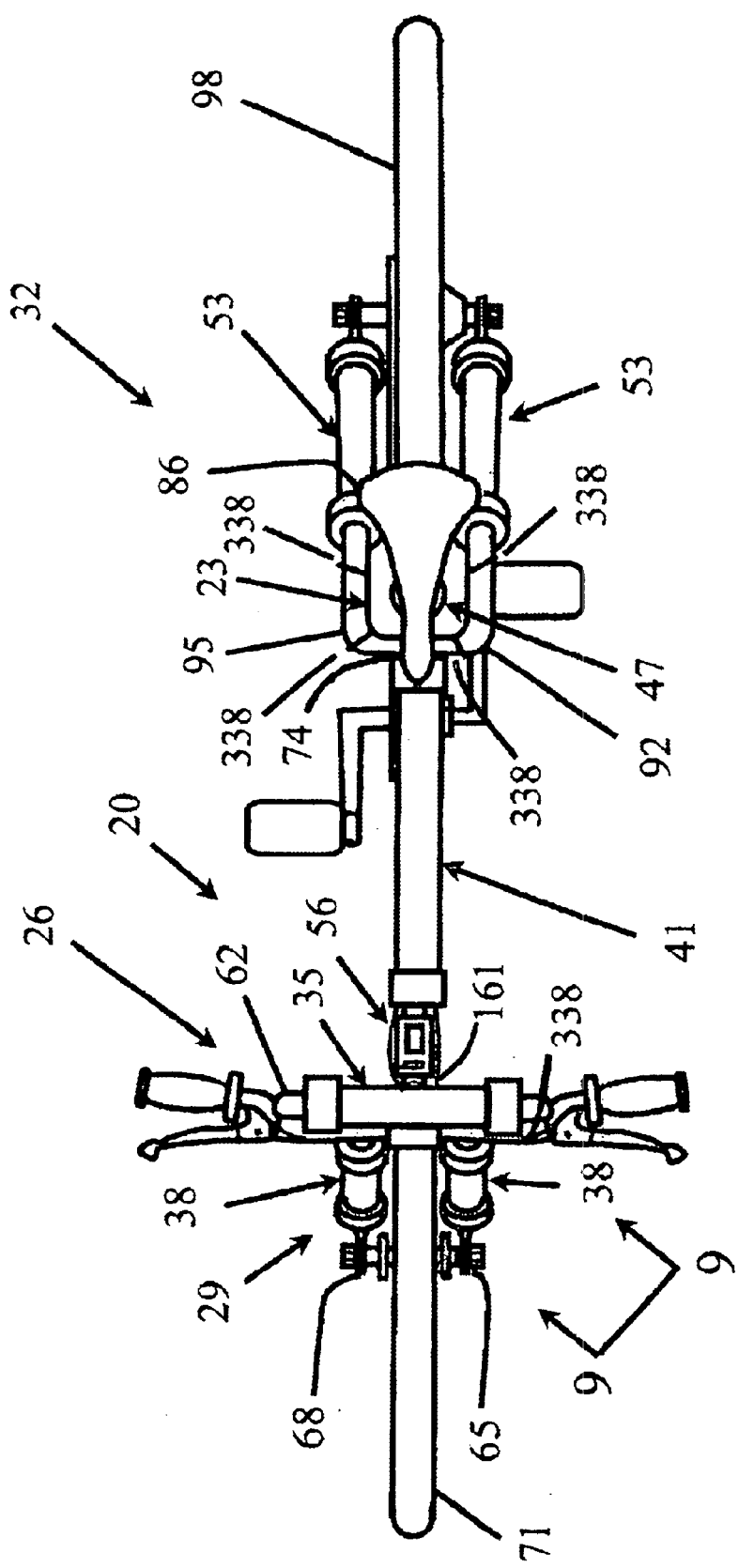
Figure 3:
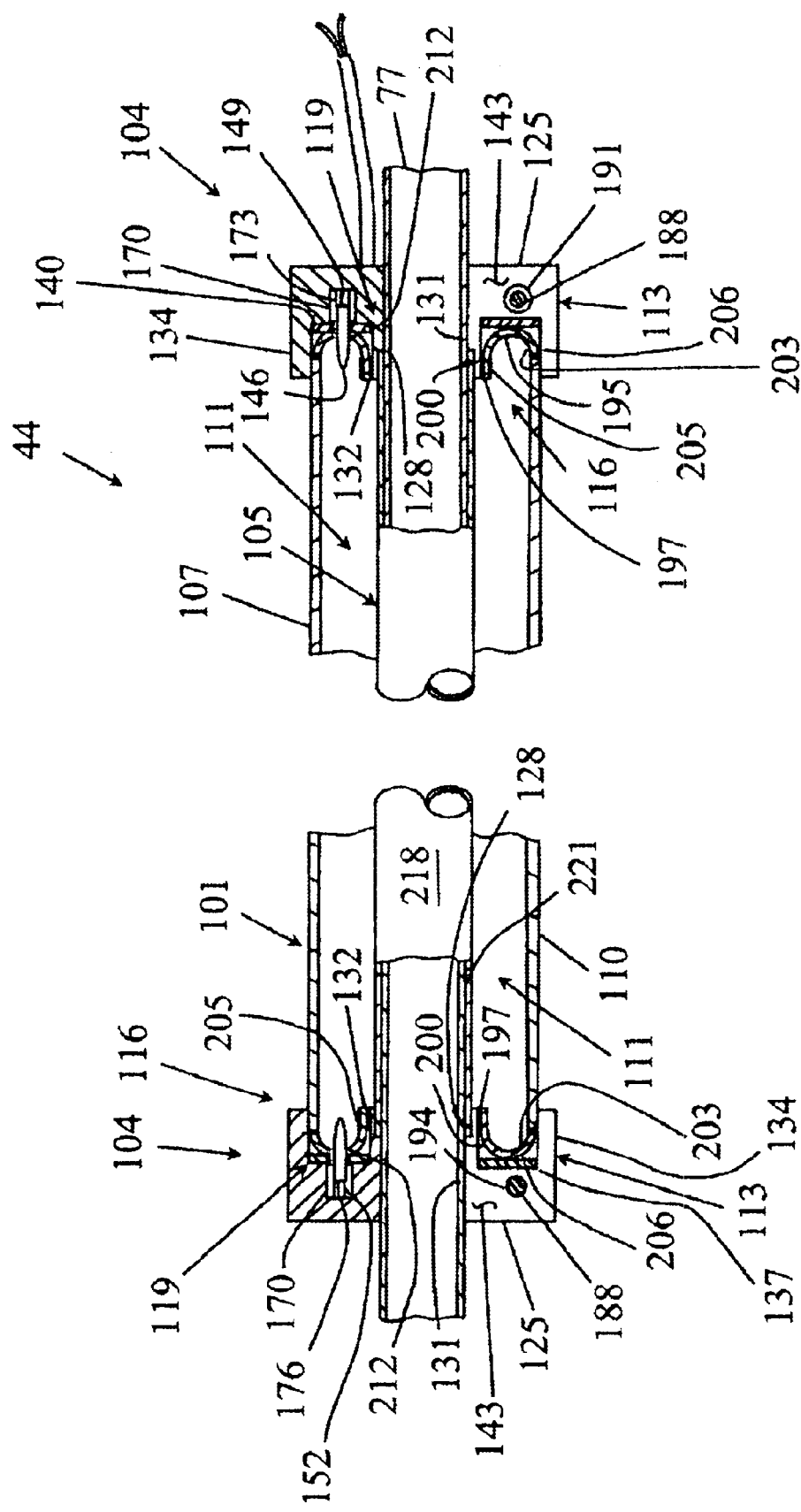
Figure 4:
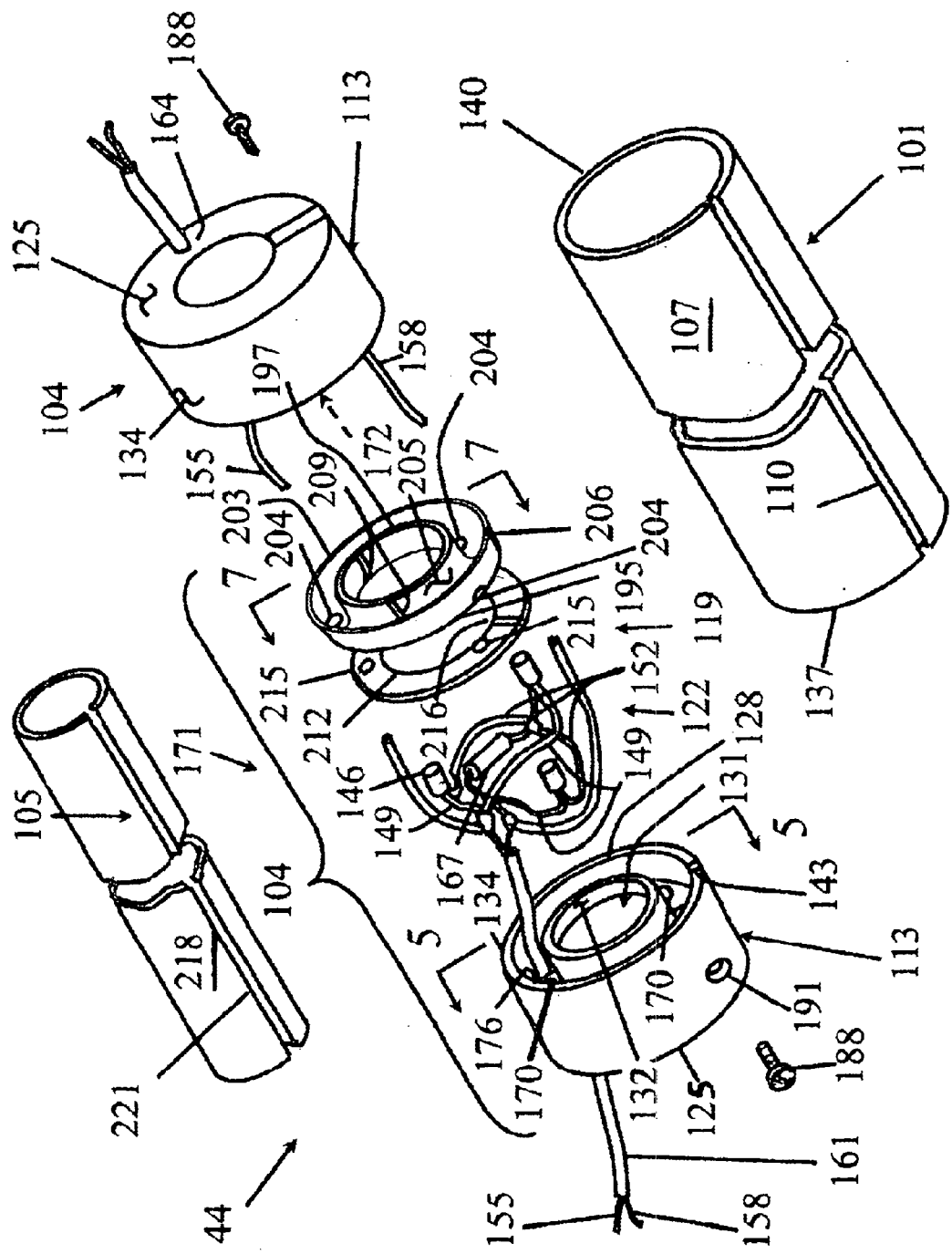
Figure 5:
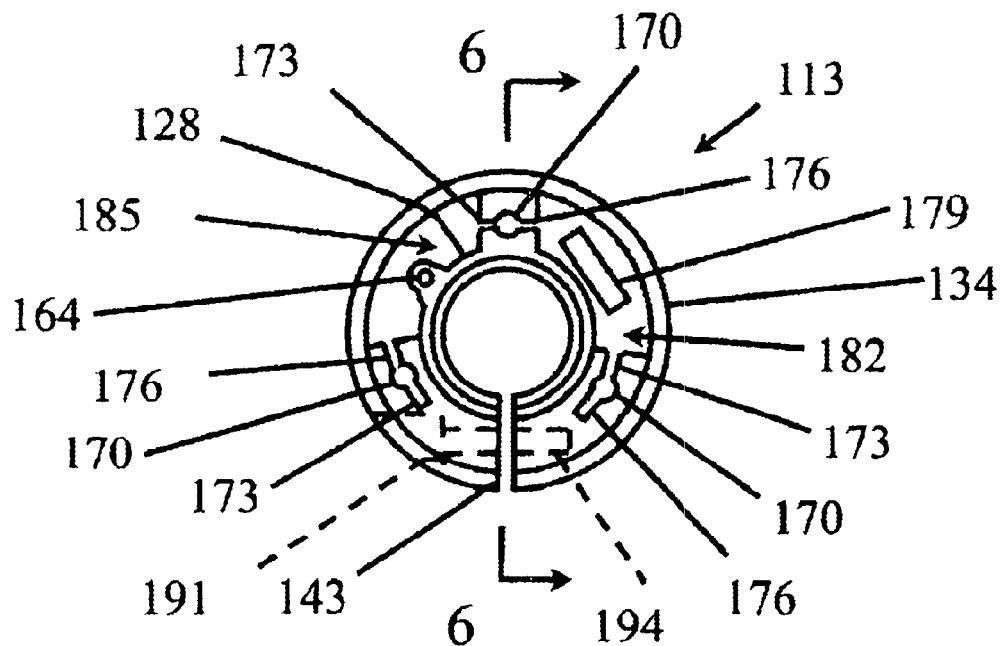
Figure 6:
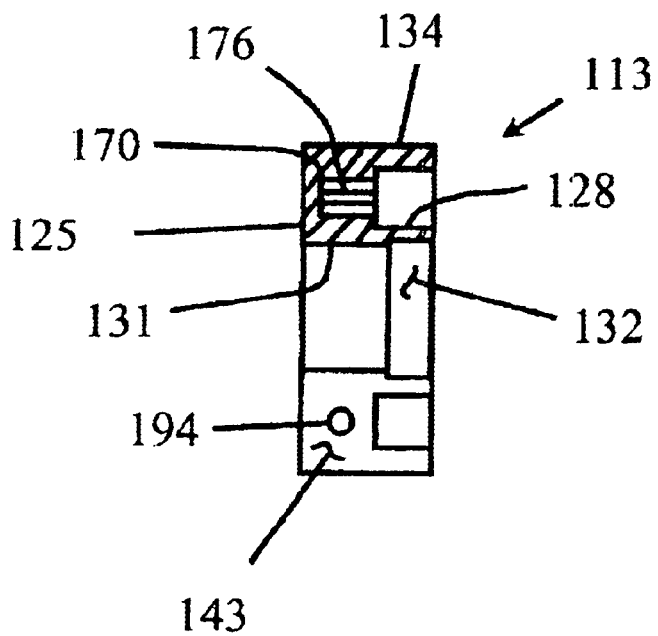
Figure 7:
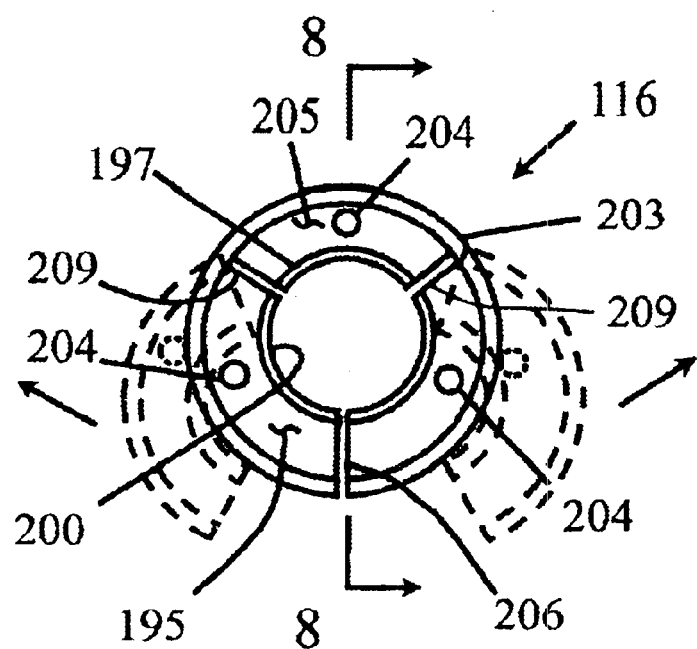
Figure 8:
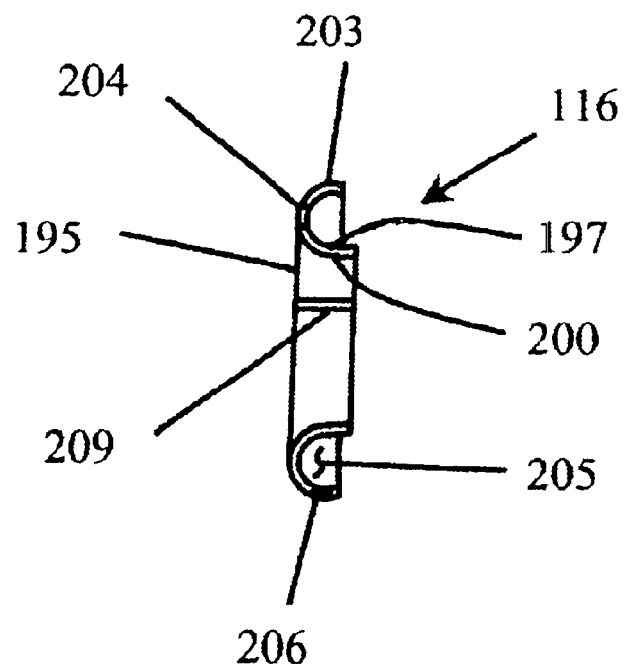
Figure 9:
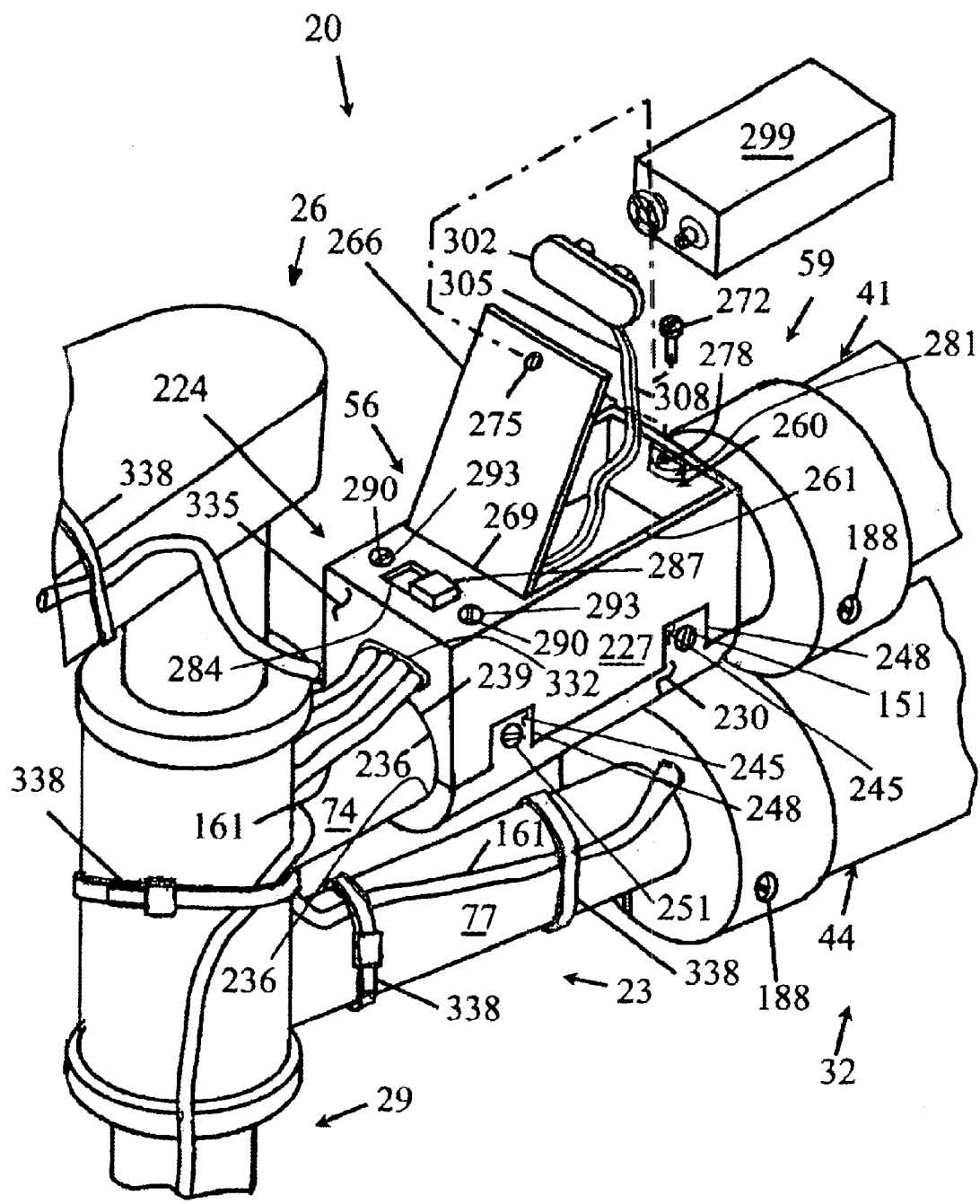
Figure 10:
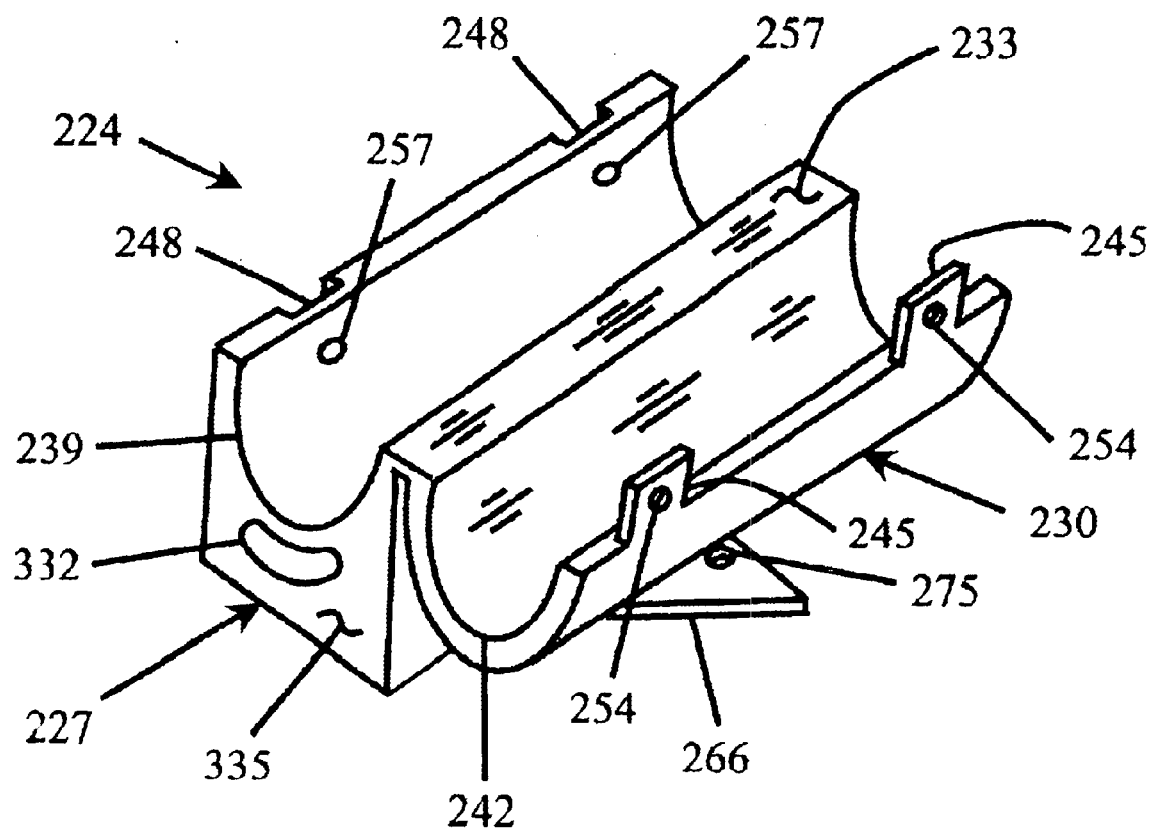
Figure 11:
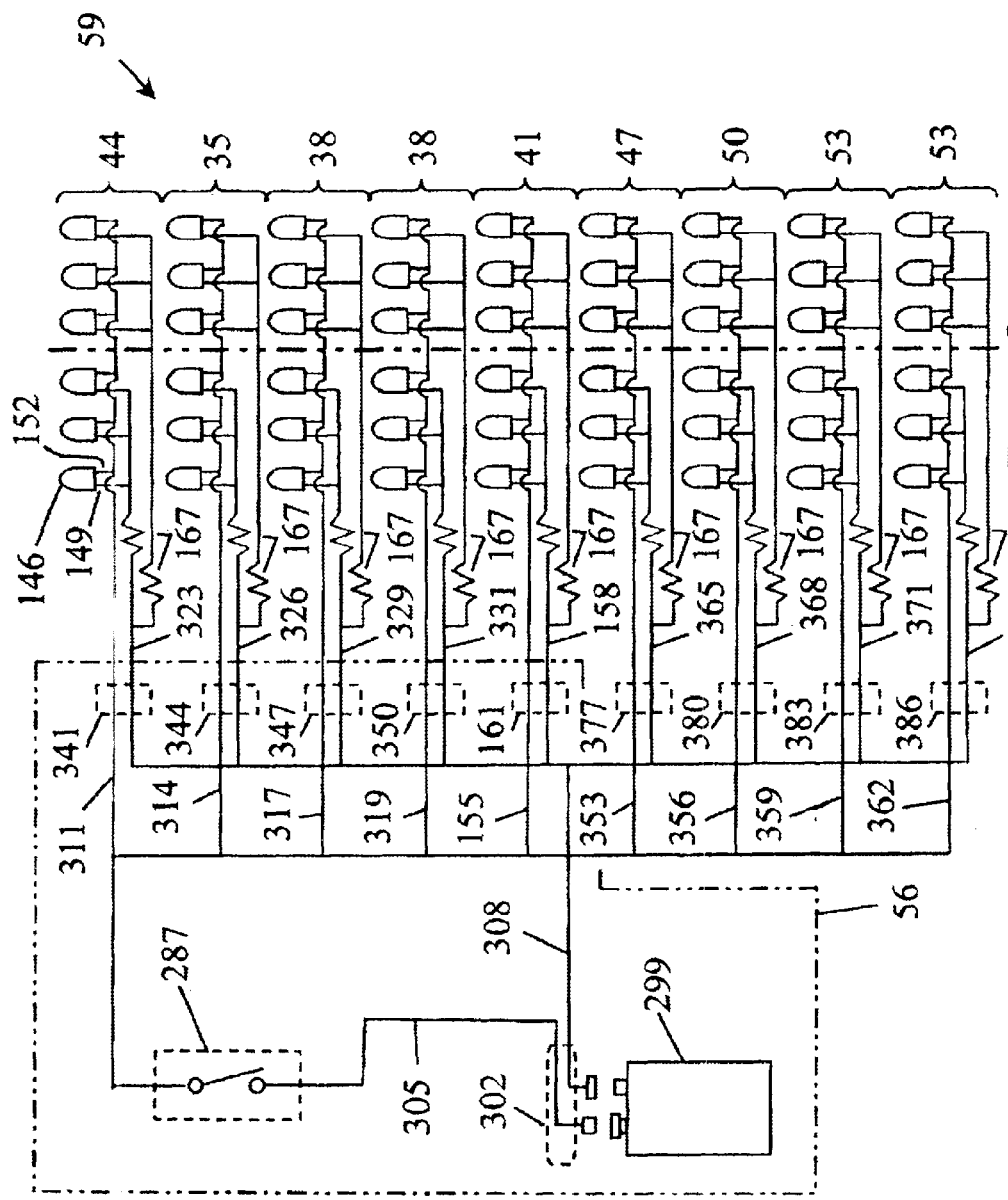

The best mode presently contemplated for carrying out the invention is illustrated in the accompanying drawings, in which:

FIG. 1 is a side elevational view of a preferred glow illumination system for bicycles in accordance with the present invention as mounted to a main frame, handle bars, and front fork of a bicycle;

FIG. 2, a top plan view of the glow illumination system mounted to the bicycle taken on the line 2—2 of FIG. 1;

FIG. 3, a lateral longitudinal sectional view to approximately life-size of a lower glow tube disposed about a lower tube of the bicycle frame taken on the line 3—3 of FIG. 1, being representative of the construction, other than overall length, of all the glow tubes of the glow illumination system;

FIG. 4, a partially exploded perspective view of the glow tubes, showing one end cap assembly of the two being exploded to show an end cap, a plurality of light emitting diodes, a resistor, an expandable reflector, and an insulator ring, an translucent outer glow tube, and an opaque inner backing tube;

FIG. 5, an inside end view of the end cap of the glow tubes taken on the line 5—5 of FIG. 4;

FIG. 6, a longitudinal vertical sectional view of the end cap taken on the line 6—6 of FIG. 5;

FIG. 7, an inside end view of the reflector of the glow tubes taken on the line 7—7 of FIG. 4;

FIG. 8, a longitudinal vertical sectional view of the reflector taken on the line 8—8 of FIG. 7;

FIG. 9, a fragmentary partially exploded perspective view to a slightly larger than life-size of a control box and two glow tubes of the glow illumination system mounted to the frame of the bicycle taken generally on the line 9—9 of FIG. 2 showing installation of a transistor radio battery into the control box to power the glow illumination system;

FIG. 10, a perspective view of the control box in an open position permitting installation onto the frame of the bicycle; and FIG. 11, an electrical schematic for the glow illumination system.

DETAILED DESCRIPTION OF THE ILLUSTRATED EMBODIMENTS

Referring to FIGS. 1 and 2 therein is shown a preferred glow illumination system for bicycles in accordance with the present invention, designated generally at 20, as mounted to a main frame 23, handle bars 26, and front fork 29 of a bicycle 32.

The glow illumination system 20 is for making the bicycle 32 more visible in low light conditions, and includes a plurality of glow illumination devices mountable to an associated support tube of the bicycle. The glow illumination devices are in the form of a handle bar glow tube 35, a pair of front fork glow tubes 38, respective upper and lower central glow tubes 41 and 44, respective upper and lower seat glow tubes 47 and 50, and a pair of rear glow tubes 53. The glow illumination system 20 further includes a separate battery pack to contain a power supply device and adapted to mount to the bicycle comprising a control box 56. The control box 56 is electrically connected through an electrical system 59 to the glow tubes 35, 38, 41, 44, 47, 50, and 53. The handle bar glow tube 35 fits about a cross tube 62 of handle bars 26. The front fork glow tubes 38 fit about respective fork tubes 65 and 68 of front fork 29 at opposite sides of a spoked front wheel 71 rotationally supported thereby. The handle bars 26 are connected to the front fork 29, both being pivotally connected to the main frame 23. The upper central glow tube 41 is disposed about an upper tube 74 of main frame 23 immediately behind the control box 56. The lower central glow tube 44 is disposed about an angled lower tube 77 of main frame 23. The upper seat glow tube 47 is disposed about an upper seat support tube 80 of main frame 23 which supports a slidable seat support tube 83 to which a seat 86 is pivotably affixed. The lower seat glow tube 50 is disposed about a lower seat support tube 89 of main frame 23. The rear glow tubes 53 fit about respective curved upper tubes 92 and 95 of main frame 23 at opposite sides of a spoked rear wheel 98 rotationally supported thereby.

Referring to FIGS. 3 and 4, the lower central glow tube 44 is shown, being representative of the construction of all of the glow tubes 35, 38, 41, 44, 47, 50, and 53 of the glow illumination system 20 except for possible changes in overall length and diameter, includes a translucent outer glow tube 101 and a pair of end cap assemblies 104, and an inner backing layer in the form of an inner backing tube 105. The glow tube 101 is of a circular cross-section, being made of a flexible, preferably translucent plastic such as polyethylene, polypropylene, or polyvinyl chloride which permits light to pass therethrough but which diffuses the light such that the glow tube glows substantially evenly along an entire longitudinal length thereof. The glow tube 101 has a thin wall 107 of between about 0.062 inch to 0.125 inch thick which includes a longitudinal slit 110 which may be opened sufficiently by outwardly flexing the wall 107 of glow tube 101 to be placed disposed in a coaxial, radially spaced position about the associated support tube, angled lower tube 77 of main frame 23. Glow tube 101 has an inner diameter which is larger than the outer diameter of angled lower tube 77 such that an elongate doughnut-shaped annular glow chamber 111 is formed therebetween to permit light propagation therethrough. The end cap assemblies 104 each include an end cap 113, an expandable reflector 116, an insulator ring 119, and an electrical assembly 122.

The end cap 113 includes a circular end wall 125 to receive the glow tube 101, an inner flange 128 dependent from the end wall 125 which defines a central hole 131 of a size which is slightly smaller than the associated support tube, angled lower tube 77. An annular groove 132 extends longitudinally into inner flange 128 a short distance. An outer flange 134 dependent from the end wall 125 closely receives an end 137 and 140 of the glow tube 101 to retain the glow tube 101 coaxially disposed about the angled lower tube 77 engaged between the end caps 113. Outer flange 134 has an inner diameter which is slightly larger than the outer diameter of glow tube 101. The inner flange 128 dependent from the end wall 125 is in a coextensive, spaced relationship with the outer flange 134. The end cap 113 includes a radial slit 143 which extends radially outwardly from central hole 131 through end cap 113. The end cap 113 is made of a flexible, preferably opaque plastic such as polyethylene, polypropylene, or polyvinyl chloride which is manufactured with pigments to block the passage of light therethrough. The radial slit 143 may be opened sufficiently by outwardly flexing end cap 113 to be placed disposed about the associated support tube, angled lower tube 77 of main frame 23 within the central hole 131 thereof. A plurality of light emitting devices comprising respective light emitting diodes 146 of the electrical assembly 122 have respective bare lead wires 149 and 152, lead wires 149 which are connected in parallel to a first connecting wire 155, and lead wires 152 which are connected in parallel to a second connecting wire 158, both of which are contained within a protective sleeve 161 and extending through a hole 164 through end cap 113. Lead wires 149 are connected directly to second connecting wire 158 while lead wires 152 are connected through a resistor 167 to first connecting wire 155. The light emitting diodes 146 are adhesively retained within respective diode holes 170 of end wall 125, the light emitting diodes 146 of each end cap 113 comprising a respective diode group 171 and 172. The light emitting diodes 146 of each diode group 171 and 172 are wired together in parallel. The diode groups 171 and 172 are electrically interconnected by portions of the first and second connecting wires 155 and 158 which extend longitudinally through the glow tube 101. The bare lead wires 149 and 152 are maintained apart routed through respective lead wire grooves 173 and 176 extending therefrom. The resistor 167 is adhesively affixed within a mating groove 179 in a hollowed portion 182 of end wall 125 adjacent another hollowed portion 185.

The end cap 113 firmly grips the angled lower tube 77 with the radial slit 143 being closeable using a retaining device in the form of a self-tapping screw 188 which extends through a counterbored clearance hole 191 which extends into end wall 125 tangentially of central hole 131 perpendicular to radial slit 143, and which threads into a smaller thread engaging hole 194 coaxially disposed through end wall 125 on the opposite side of radial slit 143. This permits the radial slit 143 to be drawn closed upon insertion and tightening of screw 188 to draw the central hole 131 tightly about the angled lower tube 77, such that the end cap 113 firmly grips the angled lower tube 77 to retain the glow tube 101 and the end caps 113 affixed thereabout. Various angled lower tube 77 of differing outer diameters may be accommodated by making the central hole 131 of an inner diameter which is slightly smaller than the largest outer diameter of angled lower tube 77 on which the end caps 113 are to be used. One or more shims (not shown) made of thin flexible metal or plastic may then be used to achieve a tight fit on the smaller angled lower tubes 77. Alternatively, a plurality of different sized slit bushings (not shown) may be designed to fit desired angled lower tubes 77 of different outer diameters.

The expandable reflector 116 includes an longitudinally rounded annular end portion 195, a dependent inner flange portion 197 which defines a central hole 200 of a size sufficient to receive the associated support tube, angled lower tube 77, having an inner diameter which is slightly larger than an outer diameter of inner flange 128 of end cap 113. An outer flange portion 203 is in a coextensive, spaced relationship with inner flange portion 197, having an outer diameter which is slightly smaller than an inner diameter of the glow tube 101 when assembled to end cap 113. A plurality of diode clearance holes 204 are disposed through reflector 116 in corresponding arrangement to diode holes 170 of end wall 125. The expandable reflector 116 includes a reflective surface 205 which is disposed at opposite ends of the glow tube 101 and through which the light emitting diodes 146 extend. The reflective surface 205 reflects light produced by the light emitting diodes 146 longitudinally inwardly into the glow tube 101. A main radial slit 206 extends radially outwardly from central hole 200 completely through one-half of reflector 116. A pair of secondary radial slits 209 extend radially outwardly from central hole 200 through the inner flange portion 197 and the end portion 195, but not through the outer flange portion 203. This permits reflector 116 to expand to the dotted line position by opening the main radial slit 206 pivoting about the outer flange portion 203 at the secondary radial slits 209 to permit the expandable reflector 116 to be assembled is about the associated support tube, angled lower tube 77, then closed to the original shape disposed thereabout. The expandable reflectors 116 mount to the respective end caps 113 being retained sandwiched between the end caps 113 and the ends 137 and 140 of the glow tube 101, disposed about the angled lower tube 77. Expandable reflector 116 is preferably stamped from a thin polished reflective metal or molded from a reflective plastic material.

The insulator ring 119 is preferably stamped from in a circular shape from a thin insulating cardboard, paper, plastic, or other such material, including a central hole 212 having an inner diameter which is slightly larger than an outer diameter of inner flange 128 of end cap 113, and a plurality of diode clearance holes 215 disposed in corresponding arrangement to diode holes 170 of end wall 125. A radial slit 216 allows insulator ring 119 to be assembled around the angled lower tube 77.

The inner backing tube 105 is made of a flexible, opaque plastic such as polyethylene, polypropylene, or polyvinyl chloride that snugly fits disposed about the angled lower tube 77, being made of a light colored material which reflects light in a diffuse manner to the glow tube 101. The inner backing tube 105 has a thin wall 218 of between about 0.032 inch to 0.062 inch thick which has a longitudinal slit 221, and an inner diameter which is slightly smaller than the outer diameter of angled lower tube 77. The longitudinal slit 221 may be opened sufficiently by outwardly flexing wall 218 to place inner backing tube 105 snugly disposed about the angled lower tube 77 of main frame 23.

Referring to FIGS. 9 and 10, the control box 56 includes a housing 224 comprising an upper housing half 227 and a lower housing half 230 which are connected by a living hinge 233. The housing 224 is preferably integrally injection molded from an opaque plastic such as polyethylene, polypropylene, or polyvinyl chloride in the position shown in FIG. 10. The housing 224 has a longitudinal bore 236 of an inner diameter slightly less than the outer diameter of the angled lower tube 77 of main frame 23, being comprised of a longitudinal half-bore 239 of the upper housing half 227 and a longitudinal half bore 242 of the lower housing half 230. The housing 224 is retained in a position firmly gripping the angled lower tube 77 by a pair of tabs 245 which extend vertically from lower housing half 230 into a pair of mating slots 248 in the upper housing half 227. A pair of flat-head, self-tapping screws 251 extend through respective countersunk clearance holes 254 of tabs 245, and which thread into respective smaller coaxial thread engaging holes 257 disposed into upper housing half 227 within the slots 248. This retains the longitudinal bore 236 tightly closed upon insertion and tightening of the screws 251. The upper housing half 227 includes an inner chamber 260 accessible through a rectangular hole 261 through a flat upper surface 263 of upper housing half 227, and which is coverable by a rectangular door 266 connected to the upper housing half 227 at a living hinge 269. The door is retained in a closed position by a self-tapping screw 272 which extends through a counterbored clearance hole 275 of door 266, and which threads into a smaller coaxial thread engaging hole 278 disposed into an inwardly extending tab 281 of upper housing half 227. A rectangular hole 284 extends through the upper surface 263 into the inner chamber 260 forward of the door 263.

The electrical system 59 includes an on/off switch 287 which is secured within the hole 284 using a plurality of flat-head self-tapping screws 290 which extend through respective countersunk clearance holes 293 through flat upper surface 263 of upper housing half 227 threading into a hole of a mounting plate (not shown) of switch 287. The glow tubes 35, 38, 41, 44, 47, 50, and 53 are connectable to a power supply device in the form of a nine volt transistor radio battery 299 which supplies electrical energy to power the light emitting diodes 146 of glow illumination system 20. The battery 299 connects to an electrical connector 302 of the type used in transistor radios, and which extends from the inner chamber 260 when door 266 is open. The battery 299 is then stowed in the inner chamber 260. A pair of insulated wires 305 and 308 extend from connector 302, wire 305 being connected to switch 287 and wire 308 being connected to a plurality of first connecting wires 155, 311, 314, 317, and 319. A wire 320 from switch 287 connects to a plurality of second connecting wires 158, 323, 326, 329, and 331.

The respective first and second connecting wires are paired together, connecting wires 311 and 323 within a protective sleeve 341 extend from a front curved slot 332 through a front surface 335 of upper housing half 227 and through the hole 164 of end cap 113 of the lower central glow tube 44. A plurality of plastic wire ties 338 retain wire containing sleeve 341 to the main frame 23 of the bicycle 32. Connecting wires 314 and 326 within a protective sleeve 344 extend from the front curved slot 332 of upper housing half 227 and through the hole 164 of end cap 113 of the handle bar glow tube 35. A plurality of the plastic wire ties 338 retain wire containing sleeve 344 to the main frame 23 and handle bars 26 of the bicycle 32. Connecting wires 317 and 329 within a protective sleeve 347, and connecting wires 319 and 331 within a protective sleeve 350 extend from the front curved slot 332 of upper housing half 227 and through the hole 164 of respective end caps 113 of the respective front fork glow tubes 38. A plurality of the plastic wire ties 338 retain wire containing sleeves 347 and 350 to the main frame 23 and front fork 29 of the bicycle 32. Connecting wires 155 and 158 within the protective sleeve 161 extend from front curved slot 332 of upper housing half 227 and through the hole 164 of end cap 113 of the upper central glow tube 41. A plurality of the plastic wire ties 338 retain wire containing sleeve 161 to the main frame 23 of the bicycle 32.

A plurality of third connecting wires 353, 356, 359, and 362 are connected to first connecting wire 155, and a plurality of fourth connecting wires 365, 368, 371, and 374 are connected to second connecting wire 158. The respective third and fourth connecting wires are paired together, connecting wires 353 and 365 within a protective sleeve 377 extend from the hole 164 of end cap 113 of the upper central glow tube 41 and through the hole 164 of end cap 113 of the upper seat glow tube 47. A plurality of the plastic wire ties 338 retain wire containing sleeve 377 to the main frame 23 of the bicycle 32. Connecting wires 356 and 368 within a protective sleeve 380 extend from the hole 164 of end cap 113 of the upper central glow tube 41 and through the hole 164 of end cap 113 of the lower seat glow tube 50. A plurality of the plastic wire ties 338 retain wire containing sleeve 380 to the main frame 23 of the bicycle 32. Connecting wires 359 and 371 within a protective sleeve 383, and connecting wires 362 and 374 within a protective sleeve 386 extend from the hole 164 of end cap 113 of the upper central glow tube 41 and through the hole 164 of respective end caps 113 of the respective rear glow tubes 53. A plurality of the plastic wire ties 338 retain wire containing sleeves 383 and 386 to the main frame 23 of the bicycle 32.

The present invention provides a glow illumination device and system that may be used on virtually any bicycle to illuminate the majority of the bicycle frame. The glow illumination devices glow continuously in an even intensity along their entire length in any color desired without any of the individual light emitting devices being visible. The glow illumination devices are durable and shock resistant which is particularly important for use by children. The glow illumination devices and system may be built into new bicycles, or supplied as a retrofit kit for existing bicycles. The glow illumination devices are very appealing to children and other persons, and safer due to their high visibility yet not blinding or overly distractive to motorists.

The present invention also meets the stated deficiencies of prior bicycle illumination devices by providing a glow illumination device and system which utilizes light emitting diodes that are powered by a battery rather than an electrical generator so as to produce continuous illumination even when the bicycle is moving slowly or not moving at all. The light emitting diodes have low electrical power requirements so the battery lasts a reasonable period of time before needing to be replaced. The glow illumination system illuminates the whole bicycle sufficiently that motorists recognize the bicycle as a bicycle and know the distance, direction, and speed of the bicycle, particularly by motorists approaching from the side of the bicycle. The glow illumination system is large enough to improve low light visibility yet is integrated into the bicycle so as not to restrict the normal operation of the bicycle. The glow illumination system appeals to younger riders as being fashionable so they want the lighting device installed and turn it on during periods of low light. The light emitting diodes having a long life so as not to require replacement and produce a light output which sufficiently lights the bicycle so as to be easily seen by motorists. The glow illumination system may be integrally built into new bicycles at time of manufacture yet is also easily retrofittable to existing bicycles. The cost of the glow illumination system is low so as to be reasonably priced to consumers. The glow illumination devices are firmly affixed to the bicycle and illuminate the entire outline the bicycle as a glow rather than only dots of light so motorists have no difficulty identifying the bicycle as a bicycle.

Many changes are possible to the present invention while staying within the same inventive concept. For example, the outer tubes may be different colors and/or various colored light emitting diodes used. The light emitting devices may be other than light emitting diodes, such as small light bulbs. The light emitting devices may be made to flash in various patterns to attract attention. Various shapes of the outer tube and end caps include other than circular, such as rectangular, triangular, or hexagonal, preferably with rounded longitudinal edges to reduce the chance of injury on the edges. While the light emitting devices are shown wired in parallel rather than in series for increased reliability such that a burned-out light emitting device does not cause the other light emitting devices to go out, other schemes may be used with or without the resistors. The light emitting devices may be made to be replaceable such as by using snap-fit or screw sockets rather than adhesives to connect to the end caps. The glow illumination devices may be made integrally with the bicycle, such as by using non-radially-slit end caps made of formed sheet metal which are slipped over the respective support tubes prior to welding of the main frame, handle bars, etc. Such sheet metal end caps require no separate reflector, the polished interior surface of the end caps reflecting the light sufficiently. Other power supply devices are possible, such as conventional bicycle generators which mount to the bicycle and have a wheel which rotationally engages the tire, or rechargeable batteries. The power supply may be removably mounted to the bicycle using snap clips.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A glow illumination device for making a bicycle more visible in low light conditions, the bicycle which includes a plurality of support tubes forming a main frame rotationally supporting a rear wheel, a handle bars connected to a front fork rotationally supporting a front wheel, the handle bars and front fork being pivotally connected to the main frame, the glow illumination device being connectable to a power supply device which supplies electrical energy to power the glow illumination device, the glow illumination device comprising:

a glow tube which permits light to pass therethrough, said glow tube having an inner diameter which is larger than an outer diameter of an associated support tube of the bicycle and being adapted to be disposed in a coaxial, radially spaced position about the associated support tube such that an elongate doughnut-shaped annular glow chamber is formed therebetween to permit light propagation therethrough;

a pair of end caps each having an end wall with a central hole of a size sufficient to receive the associated support tube and an outer periphery adapted to retain said glow tube coaxially disposed about the support tube engaged between said end caps; and at least one light emitting device retained to said end wall of one end cap and operatively connected to the power supply device.

2. The glow illumination system of claim 1, wherein the glow tube is translucent to permit light to pass therethrough but which diffuses the light such that said glow tube glows substantially evenly along an entire longitudinal length thereof.

3. The glow illumination system of claim 1, wherein the light emitting devices comprise respective light emitting diodes.

4. The glow illumination system of claim 1, wherein the glow tube is of a circular cross-section and the end wall is circular to receive said glow tube.

5. The glow illumination system of claim 1, wherein there is at least one light emitting diode retained to the end wall of each end cap, said diodes of each end cup comprising a diode group, said diode groups being electrically interconnected by a pair of longitudinal wires extending through the glow tube.

6. The glow illumination system of claim 5, wherein the diodes of each diode group are wired together in parallel.

7. The glow illumination system of claim 5, wherein the light emitting diodes are retained within respective diode holes of the end walls.

8. The glow illumination system of claim 1, wherein the end caps each include an outer flange dependent from the end wall adapted to closely receive an end of the glow tube to retain said glow tube coaxially disposed about the support tube, and an inner flange dependent from said end wall that is in a coextensive, spaced relationship with said outer flange and which defines the central hole.

9. The glow illumination system of claim 1, further comprising an inner backing adapted to snugly fit about the associated support tube, said inner backing tube being made of a light colored opaque material which reflects light in a diffuse manner to the glow tube.

10. The glow illumination system of claim 1, further comprising a separate battery pack adapted to mount to the bicycle, and to contain the power supply device in the form of at least one battery, said battery pack being electrically connected to the light emitting devices by an electrical cable.

11. The glow illumination system of claim 1, wherein a pair of reflective surfaces are disposed at opposite ends of the glow tube and through which respective of the light emitting devices extend, said reflective surface which reflects light produced by said light emitting devices longitudinally inwardly into said glow tube.

12. The glow illumination system of claim 11, further comprising a pair of reflectors which include the reflective surface and a central hole of a size sufficient to receive the associated support tube, said reflectors being adapted to mount to the end caps disposed about the associated support tube.

13. The glow illumination system of claim 1, wherein the glow tube has a thin wall which includes a longitudinal slit, and each end cap includes a radial slit which extends radially outwardly from the central hole through said end cap, said central hole being of a size which is slightly smaller than the associated support tube, said glow tube and said end caps being made of a flexible material wherein said longitudinal slit and said radial slit may be opened sufficiently by firing said glow tube and said end caps to be placed disposed about the associated support tube, said radial slits of said end caps being closeable using a retaining device to draw said central hole tightly about the associated support tube to firmly grip and retain said glow tube and said end caps affixed thereabout.

14. The glow illumination system of claim 13, further comprising a pair of reflectors which include the reflective surfaces and a central hole of a size sufficient to receive the associated support tube, said reflectors being adapted to mount to the end caps disposed about the associated support tube, said reflectors having at least one radial slit which extends radially outwardly from said central hole completely through one-half of said reflector to permit said reflector to be assembled about the associated support tube.

15. The glow illumination system of claim 1, further comprising an inner backing layer adapted to snugly fit disposed about the associated support tube, said inner backing layer being made of an light colored opaque material which reflects light in a diffuse manner to the glow tube.

16. A glow illumination system for making a bicycle more visible in low light conditions, the bicycle which includes a plurality of support tubes forming a main frame rotationally supporting a rear wheel, a handle bars connected to a front fork rotationally supporting a front wheel, the handle bars and front fork being pivotally connected to the main frame, the glow illumination device being connectable to a power supply device which supplies electrical energy to power the glow illumination device, the glow illumination device comprising:

a glow tube which permits light to pass therethrough, said glow tube having an inner diameter which is larger than an outer diameter of an associated support tube of the bicycle and being adapted to be disposed in a coaxial, radially spaced position about the associated support tube such that an elongate doughnut-shaped annular glow chamber is formed therebetween to permit light propagation therethrough;

a pair of end caps each having an end wall with a central hole of a size sufficient to receive the associated support tube and an outer periphery adapted to retain said glow tube coaxially disposed about the support tube engaged between said end caps;

at least one light emitting device retained to said end wall of one end cap and operatively connected to the power supply device; and wherein said glow tube has a thin wall which includes a longitudinal slit, and each end cap includes a radial slit which extends radially outwardly from the central hole through said end cap, said central hole being of a size which is slightly smaller than the associated support tube, said glow tube and said end caps being made of a flexible material wherein said longitudinal slit and said radial slit may be opened sufficiently by flexing said glow tube and said end caps to be placed disposed about the associated support tube, said radial slits of said end caps being closeable using a retaining device to draw said central hole tightly about the associated support tube to firmly grip and retain said glow tube and said end caps affixed thereabout, and wherein each end cap includes a counterbored clearance hole which extends into said end wall tangentially of said central hole substantially perpendicular to said radial slit, and a smaller thread engaging hole coaxially disposed through said end wall on an opposite side of said radial slit, said retaining deice comprising a screw which extends through said counterbored clearance hole and threads into said thread engaging hole to permit said radial slit to be drawn closed upon insertion and tightening of said screw such that said end cap firmly grips the support tube.

17. A glow illumination device for making a bicycle more visible in low light conditions, the bicycle which includes a plurality of support tubes forming a main frame rotationally supporting a rear wheel, a handle bars connected to a front fork rotationally supporting a front wheel, the handle bars and front fork being pivotally connected to the main frame, the glow illumination device being connectable to a power supply device which supplies electrical energy to power the glow illumination system, the glow illumination device comprising:

a translucent glow tube which permits light to pass therethrough but which diffuses the light such that said glow tube glows substantially evenly along an entire longitudinal length thereof, said glow tube having an inner diameter which is larger than an outer diameter of an associated support tube of the bicycle and being adapted to be disposed in a coaxial, radially spaced position about the associated support tube such that an elongate doughnut-shaped annular glow chamber is formed therebetween to permit light propagation therethrough;

a pair of end caps each having an end wall with a central hole of a size sufficient to receive the associated support tube and an outer periphery adapted to retain said glow tube coaxially disposed about the support tube engaged between said end caps; and at least one light emitting diode retained to said end wall of each end cap and operatively connected to the power supply device, said diodes of each end cap comprising a diode group, said diode groups being electrically interconnected by a pair of longitudinal wires extending through said glow tube.

18. The glow illumination system of claim 17, wherein the glow tube is of a circular cross-section and the end wall is circular to receive said glow tube.

19. The glow illumination system of claim 18, further comprising a separate battery pack adapted to mount to the bicycle, and to contain the power supply device in the form of at least one battery, said battery pack being electrically connected to the light emitting devices by an electrical cable.

20. The glow illumination system of claim 18, wherein a pair of reflective surfaces are disposed at opposite ends of the glow tube and through which respective of the light emitting devices extend, said reflective surface which reflect light produced by said light emitting devices longitudinally inwardly into said glow tube.

21. The glow illumination system of claim 18, wherein the glow tube has a thin wall which includes a longitudinal slit, and each end cap includes a radial slit which extends radially outwardly from the central hole through said end cap, said central hole being of a size which is slightly smaller than the associated support tube, said glow tube and said end caps being made of a flexible material wherein said longitudinal slit and said radial slit may be opened sufficiently by flexing said glow tube and said end caps to be placed disposed about the associated support tube, said radial slits of said end caps being closeable using a retaining device to draw said central hole tightly about the associated support tube to firmly grip and retain said glow tube and said end caps affixed thereabout.

22. The glow illumination system of claim 21, further comprising a pair of reflectors which include the reflective surfaces and a central hole of a size sufficient to receive the associated support tube, said reflectors being adapted to mount to the end caps disposed about the associated support tube, said reflectors having at least one radial slit which extends radially outwardly from said central hole completely through one-half of said reflector to permit said reflector to be assembled about the associated support tube.

23. A glow illumination system for making a bicycle more visible in low light conditions, the bicycle which includes a plurality of support tubes forming a main frame rotationally supporting a rear wheel, a handle bars connected to a front fork rotationally supporting a front wheel, the handle bars and front fork being pivotally connected to the main frame, the glow illumination system being connectable to a power supply device which supplies electrical energy to power the glow illumination system, the glow illumination system comprising:

a plurality of glow illumination devices adapted to fit disposed about respective support tubes of the bicycle, said glow illumination devices each having a translucent glow tube which permits light to pass therethrough but which diffuses the light such that said glow tube glows substantially evenly along an entire longitudinal length thereof, said glow tube having an inner diameter which is larger than an outer diameter of an associated support tube of the bicycle and being adapted to be disposed in a coaxial, radially spaced position about the associated support tube such that an elongate doughnut-shaped annular glow chamber is formed therebetween to permit light propagation therethrough, a pair of end caps each having an end wall with a central hole of a size sufficient to receive the associated support tube and an outer periphery adapted to retain said glow tube coaxially disposed about the support tube engaged between said end caps, and at least one light emitting device retained to said end wall of one end cap and operatively connected to the power supply device; and a separate battery pack adapted to mount to the bicycle, and to contain the power supply device in the form of at least one battery, said battery pack being electrically connected to said light emitting devices of said glow illumination devices by respective electrical cables.

24. The glow illumination system of claim 23, wherein the light emitting devices comprise respective light emitting diodes.

25. The glow illumination system of claim 24, wherein the glow tube has a thin wall which includes a longitudinal slit, and each end cap includes a radial slit which extends radially outwardly from the central hole through said end cap, said central hole being of a size which is slightly smaller than the associated support tube, said glow tube and said end caps being made of a flexible material wherein said longitudinal slit and said radial slit may be opened sufficiently by flexing said glow tube and said end caps to be placed disposed about the associated support tube, said radial slits of said end caps being closeable using a retaining device to draw said central hole tightly about the associated support tube to firmly grip and retain said glow tube and said end caps affixed thereabout.

26. The glow illumination system of claim 25, further comprising a pair of reflectors which include the reflective surfaces and a central hole of a size sufficient to receive the associated support tube, said reflectors being adapted to mount to the end caps disposed about the associated support tube, said reflectors having at least one radial slit which extends radially outwardly from said central hole completely through one-half of said reflector to permit said reflector to be assembled about the associated support tube.

27. The glow illumination system of claim 23, wherein the glow illumination devices are designed to fit support tubes of the bicycle chosen from the set consisting of a cross tube of the handle bars, a fork tube of the front fork beside the front wheel, an upper tube of the main frame, a lower tube of the main frame, an upper seat support tube of the main frame, a lower seat support tube of the main frame, and an upper tubes of the main frame beside the rear wheel.

28. The glow illumination system of claim 23, wherein the separate battery pack comprises a control box which includes a housing comprising an upper housing half and a lower housing half which am interconnectable, said housing having a longitudinal bore adapted to grip an outer diameter of the support tube, being comprised of a longitudinal half-bore of said upper housing half and a longitudinal half bore of said lower housing half, said housing being retained in a position firmly gripping the support tube by a closure device, said upper housing half which includes an inner chamber for containing the batteries accessible through a rectangular hole through a flat upper surface of upper housing half which is coverable by a rectangular door hingedly connected to said upper housing half, said door being retainable in a closed position by a retaining device.

* * * * *